UNITED STATES PATENT OFFICE.

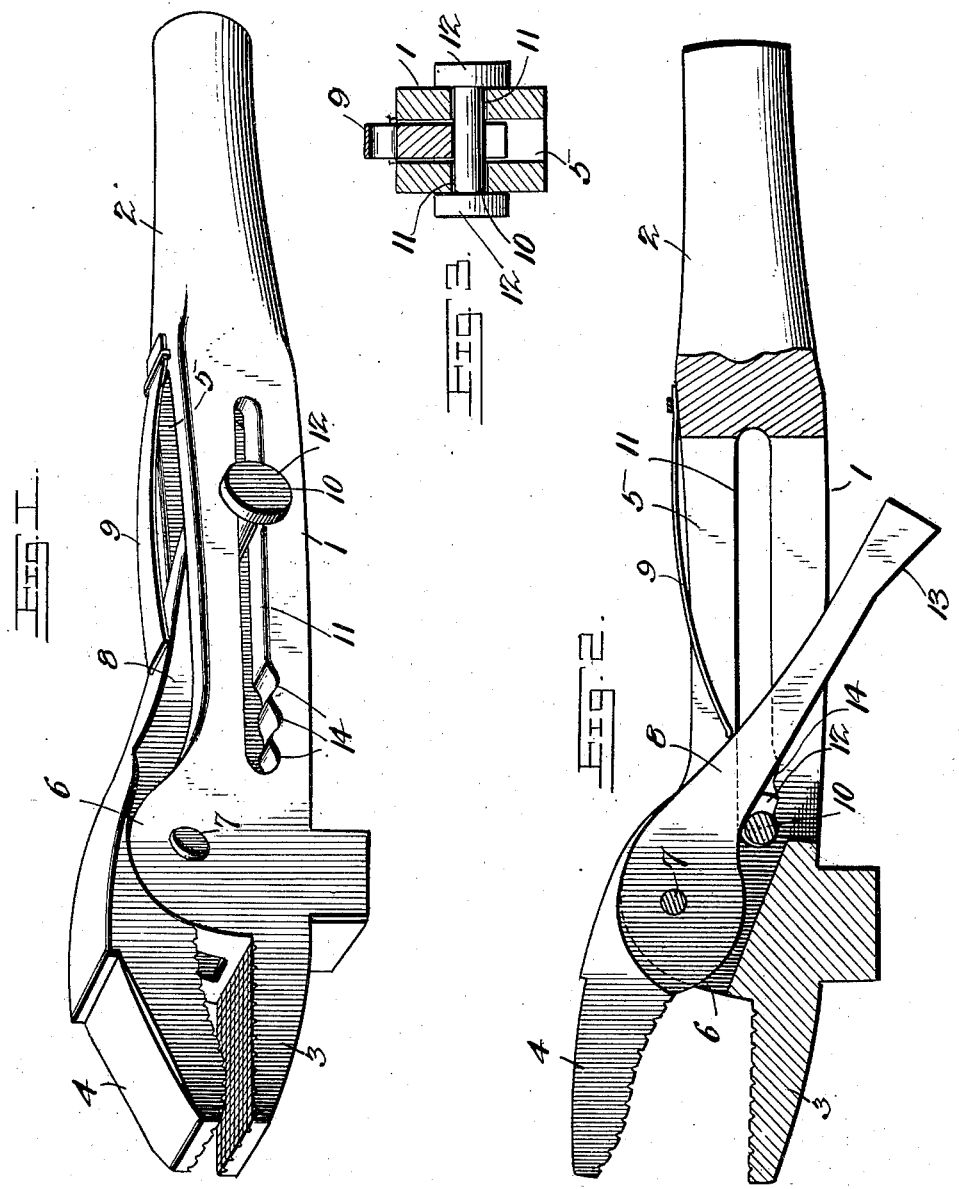

ROBERT B. BLACKBURN, OF MAYFIELD, KENTUCKY.

WRENCH.

SPECIFICATION forming part of Letters Patent No. 692,002, dated January 28, 1902.

Application filed September 26, 1901. Serial No. 76,667. (No model.)

*To all whom it may concern:*

Be it known that I, ROBERT B. BLACKBURN, a citizen of the United States, residing at Mayfield, in the county of Graves and State of Kentucky, have invented a new and useful Wrench, of which the following is a specification.

The invention relates to improvements in wrenches.

The object of the present invention is to improve the construction of wrenches and to provide a simple, inexpensive, and efficient one of great strength and durability adapted to be readily and quickly operated to adjust it to a nut or other object and to remove it therefrom.

The invention consists in the construction and novel combination and arrangement of parts hereinafter fully described, illustrated in the accompanying drawings, and pointed out in the claims hereto appended.

In the drawings, Figure 1 is a perspective view of a wrench constructed in accordance with this invention. Fig. 2 is a longitudinal sectional view of the same. Fig. 3 is a transverse sectional view.

Like numerals of reference designate corresponding parts in all the figures of the drawings.

1 designates a stock or bar provided at its inner end with a grip or handle 2 and having a jaw 3 at its outer end, which coöperates with a jaw 4, which is pivotally mounted on the stock or bar 1. The stock or bar 1 is provided between the fixed jaw 3 and the handle or grip 2 with a longitudinal opening 5, and it has a pair of perforated ears 6 arranged at opposite sides of the opening, at the outer end thereof, and receiving a transverse pivot 7, preferably consisting of a bolt and passing through the movable jaw 4, which is reduced at opposite sides to fit between the ears. The pivoted jaw 4 is provided with a shank 8, extending into the longitudinal opening 5 and engaged by a spring 9, secured at one end to the stock or bar adjacent to the handle or grip and having its other end free and engaging the outer edge of the shank 8 and adapted to swing the latter inward into the opening 5, whereby the jaws are opened automatically, when the pivoted one is free to move. The spring, which is slightly bowed, as shown, may be secured to the stock or bar in any suitable manner, and it is adapted to extend into the longitudinal opening 5, as clearly shown in Fig. 2. The inner engaging faces of the jaws may be checkered and corrugated, as shown, or they may be constructed in any other manner for enabling them to grip a nut or other object. The pivoted jaw is operated by a slide 10, consisting of a round rod or roll extending through slots 11 of the sides of the stock or bar and provided at its ends with circular heads or disks 12, which are arranged on the exterior of the said stock or bar, as clearly shown in Figs. 1 and 3. The slide is adapted to be moved quickly from one end of the slots to the other, and when it is moved inward toward the grip or handle the shank of the pivoted jaw is swung outward, and the jaws are closed. When the slide is moved in the opposite direction, the jaws are opened as the spring swings the shank inward. The shank is provided at its end 13 with a tapered or wedge-shaped portion, forming an angularly-disposed edge, which is adapted to be engaged by the slide to increase the throw or movement of the pivoted jaw. The stock or bar is provided at the outer ends of the slots with notches 14, forming seats to prevent the slide from slipping when the shank extends across the stock or bar. These notches may be of any desired number and may be arranged throughout the entire length of the slots, if desired. The slide may be constructed in any suitable manner, and the heads may be fixed to the rod or roll in any suitable way.

It will be seen that the wrench is exceedingly simple and inexpensive in construction, that it is adapted for general use, and that it is capable of being quickly manipulated to engage or release a nut or other object.

The stock or bar may be provided, as illustrated in the accompanying drawings, with an enlargement or head located at a point opposite the perforated ears and adapted to serve as a hammer-head for enabling the wrench to be used as a hammer.

The spring 9 performs the double function of opening the wrench and of holding the slide in any position, and it is designed to be just of sufficient strength to produce this result without impeding the movement of the slide.

The heads or disks 12 may be secured to the roll or body portion 10 in any suitable manner, and one of them may be provided with a threaded opening to receive one end of the pin or roll, whereby it is adapted to be screwed inward on the same to tighten the parts should the slide become loose from constant use.

What I claim is—

1. A wrench comprising a stock or bar provided with a jaw, a pivoted jaw mounted on the stock or bar and having a shank extending inward longitudinally of the stock or bar and adapted to swing transversely thereof, a slide loosely mounted on the stock or bar and arranged at and engaging the inner face of the said shank, and a spring mounted on the stock or bar and engaging the outer face of the shank and holding the latter against the slide and retaining the slide in its adjustment, substantially as described.

2. A wrench comprising a stock or bar provided with a jaw and having a longitudinal opening, said stock or bar being also provided at opposite sides of the opening with slots, a pivoted jaw mounted on the stock or bar and having an inwardly-extending shank arranged to swing inward and outward in the said opening, the slide loosely arranged in the said slots and engaging the inner face of the shank of the pivoted jaw, and a spring engaging the shank and holding the same in contact with the slide and maintaining the latter in its adjusted position, substantially as described.

3. A wrench comprising a stock or bar having a jaw and provided with a longitudinal opening, said stock or bar being also provided at opposite sides of the opening with slots and having notches therein to form seats, a pivoted jaw mounted on the stock or bar and having a shank extending into the said opening, and the slide extending through the slots and arranged to engage the shank and adapted to fit in the said seat, substantially as described.

In testimony that I claim the foregoing as my own I have hereto affixed my signature in the presence of two witnesses.

ROBERT B. BLACKBURN.

Witnesses:
JEFF. J. WILLARD,
B. C. SEARS.